United States Patent

[11] 3,609,225

[72] Inventor Langdon B. Stallard
Flushing, N.Y.
[21] Appl. No. 866,286
[22] Filed Oct. 14, 1969
[45] Patented Sept. 28, 1971
[73] Assignee Litton Systems, Inc.
Beverly Hills, Calif.

[54] VARIABLE RATE FACSIMILE SYSTEM
6 Claims, 4 Drawing Figs.

[52] U.S. Cl. .......... 178/7.7, 178/6, 178/6.7
[51] Int. Cl. .......... H04n 1/04, H04n 3/22, H04n 5/36
[50] Field of Search .......... 178/6.6 WR, 6.7, 6.7 A, 7.2 D, 7.7; 250/219 CR, 217 CR; 315/318

[56] References Cited

UNITED STATES PATENTS

| | | | |
|---|---|---|---|
| 2,922,841 | 1/1960 | Graziano .......... | 178/7.2 |
| 3,339,017 | 8/1967 | Quinlan .......... | 178/6 |

*Primary Examiner*—Bernard Konick
*Assistant Examiner*—Steven B. Pokotilow
*Attorneys*—Alan C. Rose and Alfred B. Levine

ABSTRACT: A variable rate facsimile system characterized by scanning and recording mechanisms which traverse a fixed raster pattern but whose scanning and recording rates vary according to the information content of the graphic material. The data is compressed by a known run length coding technique to effect redundancy reduction. Scanning of the copy to be transmitted and reproduction of the copy at the recorder employ cathode-ray tube flying spot scanners whose spot deflection is controlled by horizontal and vertical digital counters each driving a digital/analog converter.

VARIABLE RATE FACSIMILE SYSTEM

BACKGROUND OF THE INVENTION

The invention relates to a high speed facsimile system utilizing data compression for reduced transmission time, with novel scanning and recording mechanisms. A "line scan" system is used which requires intermittent advance of the copy and record sheet from line to line. Vertical beam deflection is used to compensate for the sluggishness of the paper movement. Prior systems which stopped transmitting during the line feed movement were inefficient particularly at high transmitting rates unless signal storage was used.

SUMMARY OF THE INVENTION

The invention relates to a facsimile system for transmitting any graphic information which can be expressed in the form of a dot matrix of black and white elemental areas. A high transmission rate is accomplished by employing cathode-ray tubes having a flying spot for scanning and recording respectively, as known in the art; and by employing the well known digital transmission technique with run length encoding of the facsimile signals. "Run length encoding" simply involves detecting the lengths of the successive black and white runs during the scanning process and transmitting binary codes representing the different run lengths. In this manner, the signal data may be compressed to increase the transmission rate of the intelligence. The variable rate of transmission obviously introduces a problem in controlling the vertical line feed or advance of the document being transmitted and of the recording sheet in the recorder.

The object of the invention in brief is to provide a compensating means for vertical deflection of the CRT flying spot combined with the long time accuracy of a mechanical paper feed such as driven feed rollers in contact with the paper. The advance of the paper is instantly translated into a control signal, as by a shaft encoder, to allow the spot to track the paper. The advance of the scanning line by the mechanical paper feed is superimposed on the tracking motion so that scanning is not stopped during the line feed advance of the paper. The mechanical paper drive may include either an intermittent motion servo or a stepping motor.

The invention thus obviates the use of a buffer storage during the interval of line feed and does not interrupt scanning during the advance of the paper sheet. Preferably mechanical paper feed mechanism is used for long time accuracy in positioning the paper on the scanner and recorder.

A further feature of the invention is the use of positional feedback in the recorder to control the writing position or position of the flying spot.

A further feature of the invention is the attainment of excellent short and long time position accuracy through the use of a single up/down counter to both control spot position and accumulate shaft encoder pulses.

Another feature of the invention resides in the use of an intermittent motion servo in conjunction with CRT spot deflection for interrupted scanning and/or recording while the paper sheet is advancing.

In order to obtain the desired transmitting speed and speed of scanning spot compensation, the scanning and recording means consists essentially of cathode ray tube flying spot scanning means, as used heretofore. The scanner illuminates the copy, the light reflected from each elemental area being impressed upon photosensitive pick up means to produce analog electrical signals which are converted into digital signals and encoded for transmission to the recorder. In the recorder, as shown by way of example, the CRT has a fiber optic faceplate and the recording is on photosensitive paper in contact with the faceplate. Obviously other suitable methods of scanning and recording may be employed.

DESCRIPTION OF A PREFERRED EMBODIMENT

Figure 1:
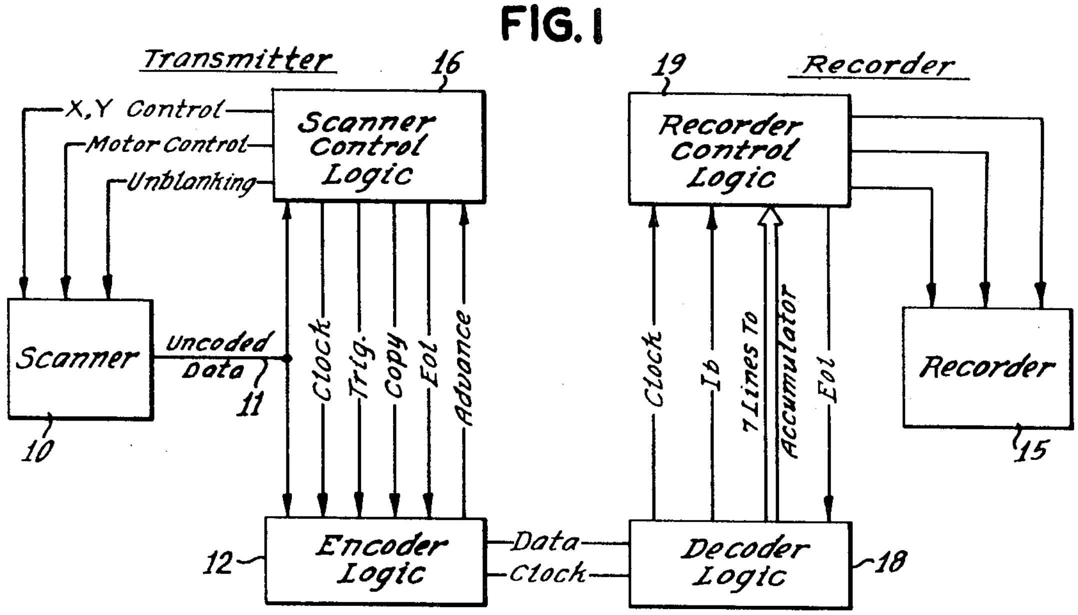
FIG. 1 is a representation in schematic form of a variable rate facsimile system embodying the invention.

Referring to FIG. 1 of the drawing, the facsimile system embodying the invention comprises a facsimile scanner and a facsimile recorder linked by a broad band transmission line. The transmitter comprises a scanner 10 which converts elemental areas of the copy or document to be transmitted into black and white analog signals which through the line 11 are impressed on the encoder logic circuit 12 for conversion into encoded binary signals. The encoded facsimile signals are transmitted over the transmission line to the recorder 15 through a decoder 18.

The process of encoding the analog facsimile signals and compressing the data to obtain a high transmitting rate involves a well-known technique which may be summarized as follows:

For purposes of explanation, it may be assumed that the technique utilizes white run length coding with no compression of the black. The code is a simple one which encodes only the run length of white data into binary code, black runs being transmitted on a one-for-one basis, as all "ones" except for the last black in a run which is transmitted as an "O." The O bit tells the recorder decoder logic that the next five data bits comprise a coded white run. During the time that the last black is being transmitted (20 $\mu$s) the next elemental area is scanned. If the next elemental area is a black, the sweep of the scanning spot stops and waits for the previous black elemental area to be sent, then scans the next elemental area. This process is repeated until a white elemental area is detected. If the elemental area is white the sweep does not stop but steps along at the maximum clock rate until the end of the white run is reached. For white run lengths longer than 30 elemental areas, an overflow code is sent.

At the end of each scan line, an end-of-line code ("EOL") is transmitted to the decoder 18 after all of the data for the associated scan line has been transmitted. The EOL code is required to give both the scanner and recorder units time to retrace for new scan lines. This scanner timing and selected code technique has the advantage that no dummy bits are required between runs of white and black, but obviously other binary coding and compression methods may be employed.

The encoder logic 12 is also connected through a scanner control logic unit 16 which is connected to the scanner 10, as shown, to control X–Y sweep of the CRT tube, the line feed driving motor for the copy being transmitted, and the unblanking of the scanner.

The received facsimile signals over the transmission line are impressed on a decoder logic unit 18 which controls the facsimile recording and spot compensation of the recorder 15 through a recorder control logic unit 19 as will be described below.

Figure 2:
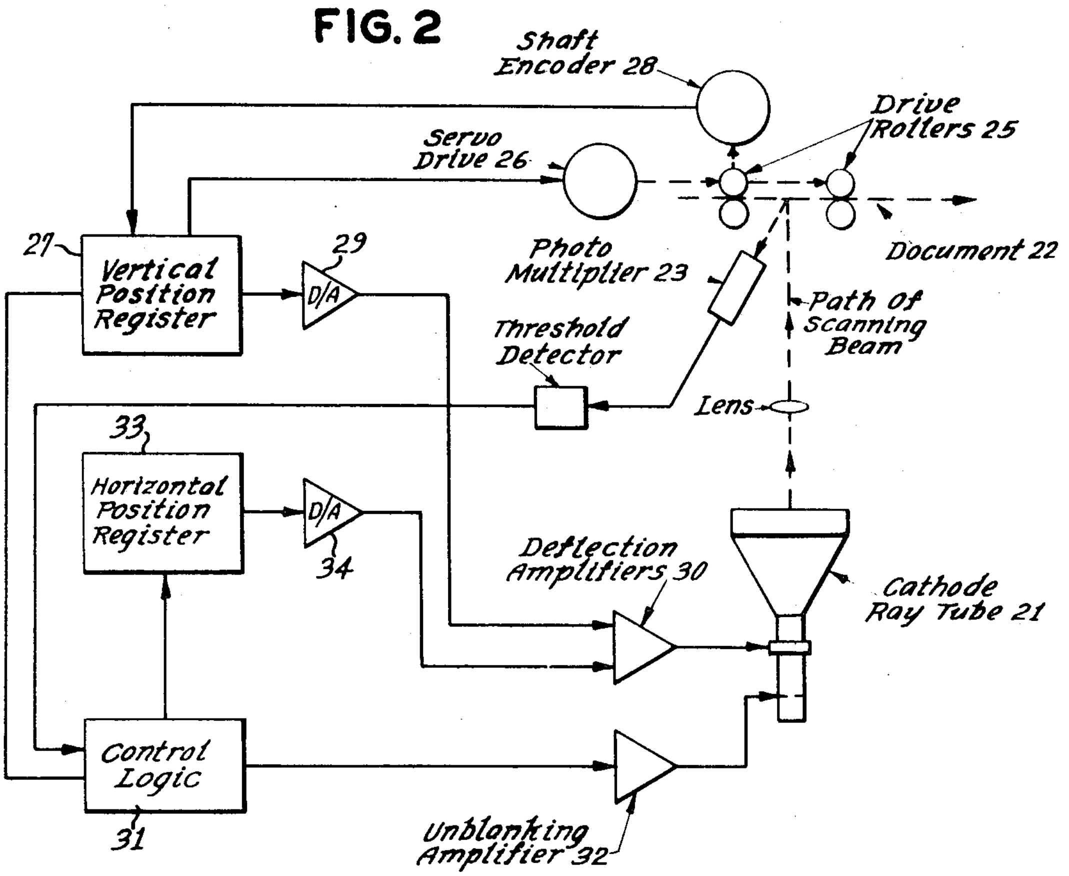
FIG. 2 is a block diagram of the scanner.

FIG. 2 is a schematic diagram of the scanner. The requirement for high-speed variable rate scanning dictates some form of electronic rather than electromechanical scanning. A CRT flying spot for illuminating the copy is the most widely used electronic scanning technique and embodies readily available components. However, other equivalent methods may be used such as large scale photodetector arrays, television camera tubes or electro-optical beam deflection. As shown, a projection optical system forms an image of the face plate of CRT 21 on the document 22 to be scanned. The sweep of the cathode ray beam across the width of the document affects line scanning in successive lines and the light reflected from the document 22 is picked up by a phototube 23 to convert the variations in light intensity to two-level electrical signals in the usual manner. The control logic unit 31 controls the unblanking amplifier 32 and has an input into the horizontal position register 33, and the vertical position register 27. The horizontal position register also controls the deflection amplifier 30 through the D/A converter 34.

Figure 3:
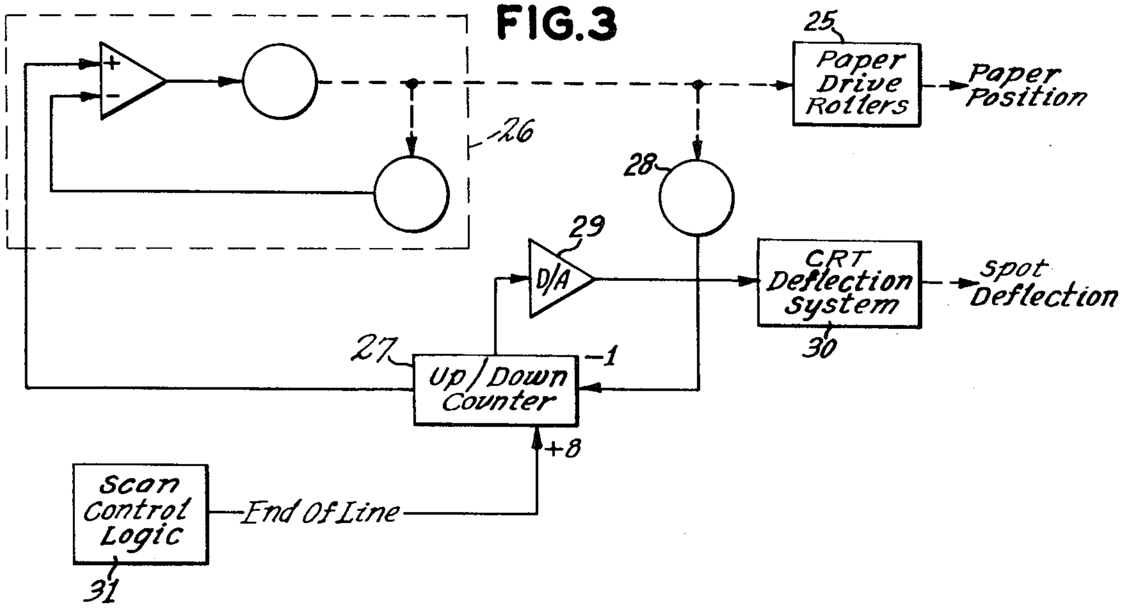
FIG. 3 is a block diagram of the line feed or paper advance system that may be employed in the scanner shown in FIG. 2

The vertical spot compensation arrangement in accordance with the invention is shown more clearly in FIG. 3. The spot deflection is controlled by horizontal and vertical position registers or counters 33 and 27 each driving a D/A converter 34 and 29 respectively. The control logic unit 31 and the horizontal position register 33 control the horizontal sweep of the CRT flying spot. The horizontal position register or horizontal counter 33 through the control logic unit 31 advances the vertical counter 27 by one line at the end of a horizontal sweep before starting the next sweep. The servo drive 26 operates with a binary input and, if the go level is applied continuously, the paper will accelerate, to say 10 inches per second, and maintain this velocity until a stop level is reapplied to the servo. The shaft encoder 28 connected to one of the paper feed rollers 25 generates successive pulses which are used to change the count in the vertical register or counter 27. The stop/go command is equivalent to the polarity of the vertical spot deflection. When the deflection becomes positive, the go command is applied until the paper moves enough so the compensation drives the deflection negative, at which time the stop level is applied to the servo 26.

The up/down counter 27 at all times contains a binary number representing the vertical position perpendicular to the scanning line of the CRT spot. The scan control logic 31 sends an end-of-line (EOL) pulse to the counter 27 at the end of each horizontal sweep of the flying spot. Each "EOL" increases the count by 8, for example, and an increment of 8 counts causes the CRT spot to move one scan line in the vertical direction through the instrumentality of the D/A converter 29 and deflection system 30. The position of the scanning spot with reference to the copy is thus corrected for instantaneous errors in position due to the relatively slow response time of the mechanical drive system.

Figure 4:
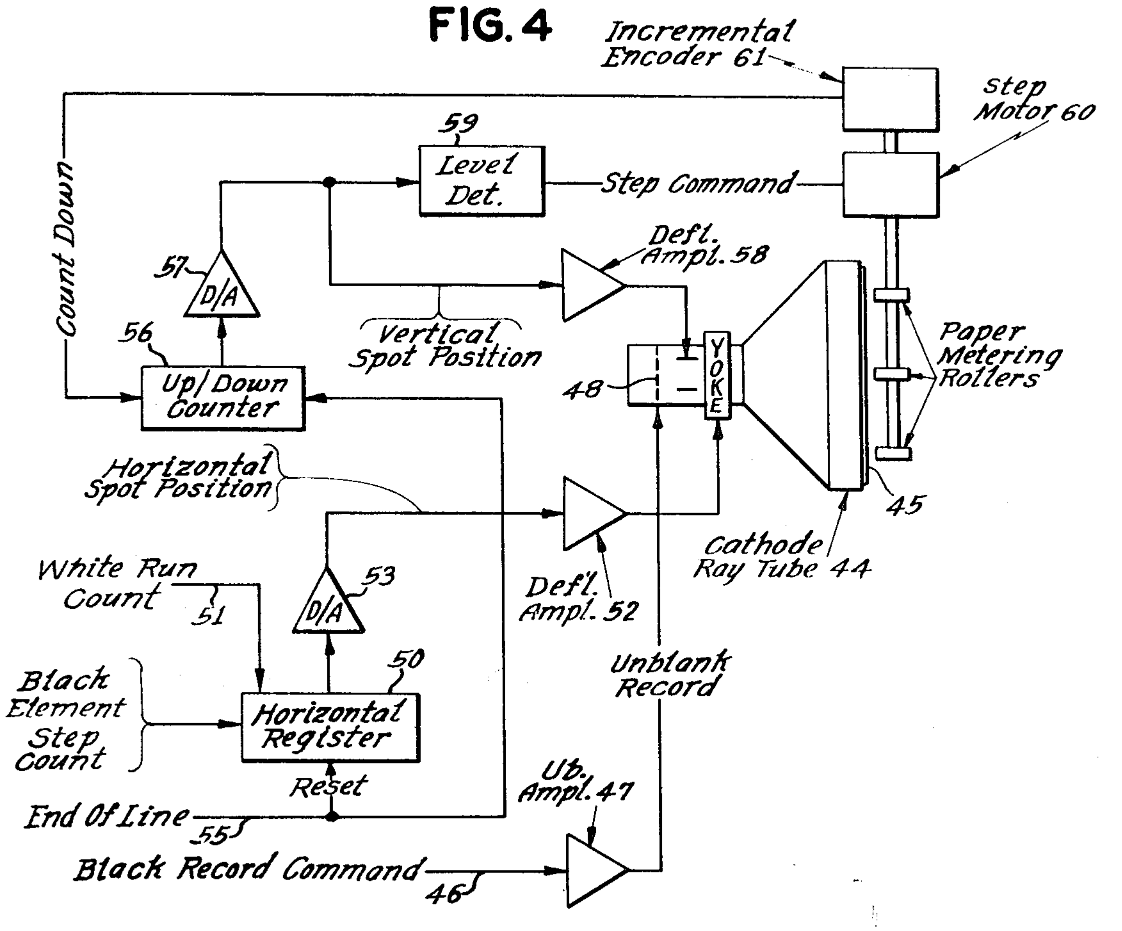
FIG. 4 is a block diagram of the recorder showing the spot compensation for continuous recording of variable rate signals.

The compensation system described may also be used where the mechanical paper feed employs a step motor instead of a servo, as shown in FIG. 4. The step motor operation is different from the servo drive described above in that the paper is moved the same predetermined distance on each step command. The step command is not given when the CRT spot crosses the center of the scanning area but, instead, the counter control is allowed to count up until the spot is at a distance beyond the center equal to ½ of a motor step, then a step command is issued to the step motor logic.

This modification is shown in connection with the schematic diagram of the recorder, FIG. 4. The recorder shown by way of example employs a cathode ray tube 44 having a fiber optic faceplate 45 of well-known design for transmitting radiant energy to the recording surface. Recording is done with photosensitive paper in contact with the faceplate. The recording beam does not come to rest on every element scanned but only on the black elements which are to be recorded. When a black or marking pulse is received on conductor 46, it is impressed through the unblanking amplifier 47 upon the control grid 48 of the CRT, and the cathode ray beam marks the recording sheet. During the recording of black information, the horizontal register 50 is advanced by one count for each black element recorded. The register 50 also counts the white run through control pulses received on conductors 51. The sweep of the CRT beam is effected by deflection amplifier 52 under control of the register 50 and the D/A converter 53. The EOL pulse on conductor 55 resets the register 50 and adds a count of 8 to the vertical counter 56. The increased count via the D/A converter 57 and deflection amplifier 58 then causes the CRT beam to move forward along the paper by an amount equivalent to one scan line. As successive lines are recorded, the CRT spot crosses the center of the faceplate and advances toward the edge. When it is one-twelfth of an inch beyond the center the level detector 59 will generate a step command to step motor 60. This will cause the motor to advance the paper by one-sixth of an inch for the assumed line spacing. As the paper moves the incremental encoder 61 sends pulses to the up/down counter 56. One pulse from the encoder 61 occurs for each one-eighth of a scan line movement of the paper. Each pulse decreases the count in the counter 56 by one, causing the CRT spot to move a distance equivalent to one-eighth of a scan line, as the paper moves. In the absence of additional "end of line" signals from the control logic the CRT vertical beam position will track the paper motion until the step is completed, at which time it will come to rest, with the vertical CRT spot position one-twelfth of an inch from the center of the faceplate. Each "end of line" signal occurring during the step will move the CRT beam by one scan line with respect to the paper, where it will continue to track the paper motion in its new position.

Thus, as in the system using an incremental servo described above, there is no need to interrupt scanning to move the paper, and variable rate scanning in a facsimile system does not present any problem due to the limitations of the mechanical paper feed at high transmission speeds.

The invention insures accurate incremental deflection of the scanning spot by detecting the mechanical position error, in a scanning or recording apparatus employing mechanical paper feed such as driven feed rollers, and using the error amplitude to control the electronic deflection means of the cathode ray tube and maintain the scanning spot in the proper vertical position during the advance of the copy or recording sheet. The instantaneous mechanical position error is continuously monitored so that a corresponding correction of the position of the scanning spot can be made. As described, a shaft encoder connected to one of the feed rollers 25 generates pulses which are employed to update a counter which in turn controls the electronic deflection of the scanning spot thus, the cathode-ray tube spot follows the mechanical sheet advance. The counter or register content indicates spot deflection amplitude and is used to initiate mechanical paper feed at a predetermined deflection amplitude. Thus the invention overcomes the difficulties encountered when mechanical sheet advance is used in a high-speed, variable rate facsimile system by a novel assembly and interconnection of conventional encoders, converters, amplifiers, and registers or counters.

What is claimed is:

1. In a variable rate facsimile communication system having a line-scan mode of scanning and a document utilizing digital transmission of intelligence signals and data compression, the improvement comprising:

- cathode-ray tube flying spot scanning means for line-scanning said document;
- control means for generating an end of line signal at the end of each line-scan;
- driving means for advancing the document through the scanning means;
- encoder means connected to said driving means for generating signals representing the instantaneous position of the document;
- counting means connected to said encoding means and said control means for generating an output signal dependent on the difference between said end of line signal and said signals representing said document position;
- means connecting said output signal from said counting means to said driving means and to said cathode-ray tube flying spot scanning means for controlling the driving means and deflecting the cathode-ray tube spot to follow the document as it is fed through the scanning means by said driving means.

2. A variable rate facsimile communication system according to claim 1, additionally comprising:

- said encoder means and said counter means including means for generating digital signals;
- said counting means including a digital counter for generating a digital output signal;

said means connecting said output signal from said counting means to said driving means including a digital to analog converter connected to said counting means; a level detector connected to said digital to analog converter; and said driving means, connected to said level detector, and including a stepping motor and drive roller means driven by said stepping motor for driving said documents.

3. A variable rate facsimile communication system according to claim 1, in which said encoder means and said control means each generate digital signals, and said counting means includes an up/down counter responsive to said digital signals for advancing said driving means whenever said counted digital signal from said control means is greater than said counted digital signal from said encoder means and for deflecting the cathode ray tube spot in proportion to the difference between said counted signals.

4. A variable rate facsimile communication system according to claim 3, in which said means connecting said digital output signal from said counting means to said driving means includes a binary operated servo, and said driving means includes motor means driven by said servo and drive roller means driven by said motor means for driving said documents.

5. A variable rate facsimile communication system according to claim 3, in which said means connecting said digital output signal from said counting means to said cathode-ray tube flying spot scanning means includes a digital to analog converter.

6. In a variable rate facsimile communication system having a line-scan mode of scanning a copy sheet utilizing transmission of signals with data compression, the improvement comprising:

cathode-ray tube flying spot scanning means for line-scanning said copy sheet;

control means for generating a digital end of line signal at the end of each line-scan;

driving means for intermittently advancing the copy sheet through said scanning means;

encoder means connected to said driving means to generate digital signals representing the position of the copy sheet before said cathode-ray tube;

a single up/down counter for accumulating said digital end of line signal and said digital encoder signals and for producing a digital output signal representative of the difference therebetween;

digital to analog conversion means connecting said counter output signal to said cathode ray tube for deflecting said flying spot to compensate for the advance of the copy; and means connecting said counter output signal to said driving means to synchronize said copy sheet and said flying spot location.